(12) United States Patent
László

(10) Patent No.: US 12,544,282 B2
(45) Date of Patent: Feb. 10, 2026

(54) AMBULANCE

(71) Applicant: AMBU-BOX KFT., Kistarcsa (HU)

(72) Inventor: Endre Márton László, Kistarcsa (HU)

(73) Assignee: AMBU-BOX KFT., Kistarcsa (HU)

( * ) Notice: Subject to any disclaimer, the term of this patent is extended or adjusted under 35 U.S.C. 154(b) by 419 days.

(21) Appl. No.: 18/269,919

(22) PCT Filed: Aug. 25, 2022

(86) PCT No.: PCT/HU2022/050064
§ 371 (c)(1),
(2) Date: Jun. 27, 2023

(87) PCT Pub. No.: WO2023/031634
PCT Pub. Date: Mar. 9, 2023

(65) Prior Publication Data
US 2024/0058184 A1 Feb. 22, 2024

(30) Foreign Application Priority Data
Sep. 6, 2021 (HU) .................................. P2100314

(51) Int. Cl.
*A61G 3/00* (2006.01)
(52) U.S. Cl.
CPC .................................. *A61G 3/001* (2013.01)
(58) Field of Classification Search
CPC ... A61G 3/00; A61G 3/001; B60P 1/64; B60P 1/6418; B60P 3/00; B60P 3/14; B60P 3/32; B60P 3/42; B60P 7/13; B60R 99/00; B62D 21/09; B62D 24/00; B62D 63/025
See application file for complete search history.

(56) References Cited

U.S. PATENT DOCUMENTS 5,829,946 A * 11/1998 McNeilus ................. B60P 1/34
410/80
5,967,596 A 10/1999 Knoop

FOREIGN PATENT DOCUMENTS

| CN | 111942483 A | * | 11/2020 | ............. B62D 27/06 |
| CN | 112869963 A | * | 6/2021 | ........... A61G 3/0825 |
| DE | 102013107730 A1 | * | 1/2015 | ............. B62D 24/00 |
| DE | 202014011104 U1 | * | 11/2017 | ............. A62C 27/00 |
| GB | 2164298 A | | 3/1986 | |
| JP | 6955805 B1 | * | 10/2021 | |
| SE | 407766 B | * | 4/1979 | ................ B60P 1/02 |

* cited by examiner

*Primary Examiner* — Lori Lyjak
(74) *Attorney, Agent, or Firm* — Olson & Cepuritis, Ltd.

(57) ABSTRACT

Ambulance having a chassis (210) that can move by itself and a self-supporting superstructure (100) including the patient compartment (110). A coupling structure (300) driven by an electric actuator is provided between the top (231) of the rear part (230) of the chassis (210) and the bottom (101) of the superstructure (100), and having two states. In fixed state the coupling structure (300) is arranged within the space with a given vertical height (h) between the top (231) of the rear part (230) of the chassis (210) and the bottom (101) of the superstructure (100). In fixed state the superstructure (100) is secured to the chassis (210), while in unfixed state the superstructure (100) can be lifted freely from the chassis (210) in a vertical direction with an external device.

8 Claims, 5 Drawing Sheets

AMBULANCE

CROSS-REFERENCE TO RELATED APPLICATIONS

Figure 1:
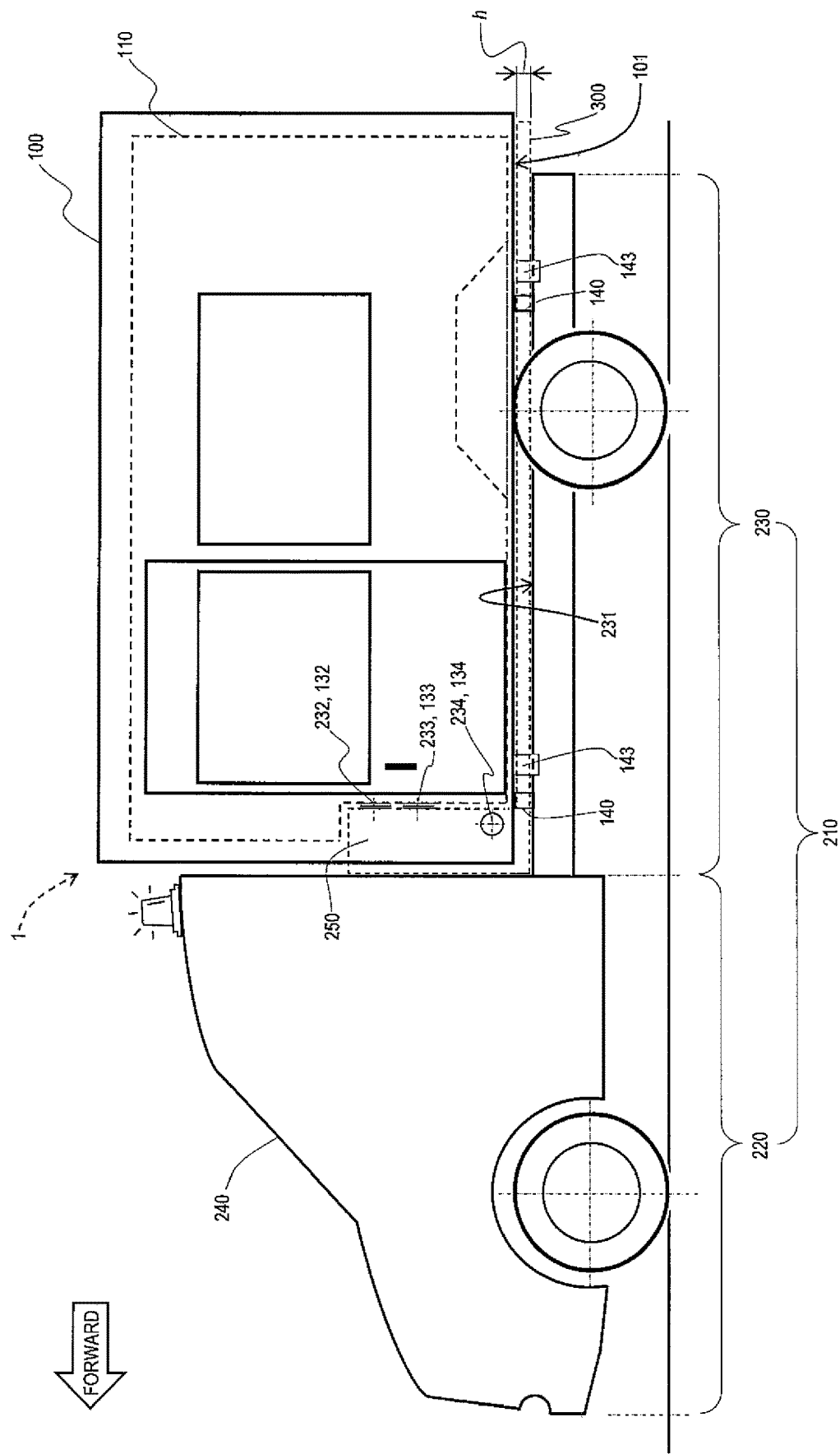

This application is a U.S. National Stage of PCT/HU2022/050064, filed Aug. 25, 2022, which claims priority to Hungarian Application No. P2100314, filed Sep. 6, 2021, each of which are incorporated herein by reference.

The present invention relates to an ambulance which has a chassis that can move by itself and a self-supporting superstructure including the patient compartment, the superstructure fits on the rear part of the chassis from above and is releasably fixed to it with mechanical connection; and has a driving cab built together with the front part of the chassis.

The history of ambulances is almost as old as the history of rescue. In the late 1800s and early 1900s, ambulance services across Europe switched from carriages pulled by horses to automobiles within a short period of time, and surprisingly, the concept of the ergonomics of the patient compartment has hardly changed in the past 100 years. While rescue technology and emergency medicine have developed significantly, the patient compartment of ambulances is still built on the basis of "transport" and not for on-site care in most countries. There are manufacturers on the market that, in the early 2000s, introduced a revolutionary new approach in the field of ergonomic concepts, prioritizing the safe and comfortable feasibility of on-site care. However, the van nature of ambulances still limited in development. The box-type rescue superstructures that appeared from the second half of the 1990s (mainly in Germany and the United Kingdom) already offered much wider possibilities, but they also carried significant disadvantages. Due to the high price, large size and weight, the complicated production and difficult repairability, these types could not take a significant market share compared to the van types. Today's rescue technical tools and today's emergency protocols have created the market demand for the creation of a new approach and concept of an ambulance superstructure, the focus of which is the comfort and safety of the patient and the person providing the care. More and more ambulances are on duty in some countries of the world. The individual rescue organizations are trying to reach the optimal average of 12,000 residents/ambulance, thus expanding their fleets. The expansion is accompanied by an increase in the number and cost of sparevehicles.

Companies producing classic van ambulances: Deltamed on the Romanian market, Sicar and Fosan on the Czech market, AMZ Kutno, BAUS and Autoform on the Polish market, Dlouhy on the Austrian market, Binz, Miesen, Ambulanz Mobile, WAS and Strobel System on the German market, Gruau on the French market, Bergadana on the Spanish market, Tamlans and Eurolans on the Scandinavian market, and VCS and O&H on the British market are the most important ambulance manufacturers. Apart from these, there are many small companies in Europe, mainly in the southern countries, that mainly satisfy local needs, but produce less than 100 ambulances annually. Its disadvantage compared to the traditional van design—especially in the case of Eastern European manufacturers—may be the higher unit price, but this is compensated by the longer service life. Since in the case of converting a van, the value of the patient compartment can be 50-70% of the value of the entire ambulance, the higher price paid by the buyer pays off already when two chassis are replaced.

The construction of an ambulance is outlined by several international standards, deviations from the prescribed conditions are not allowed. Examples including but not limited to the maximum floor height of the patient compartment defined as 750 mm from the ground (EN 1789:2020), the safe fixing of furnishings and accessories (10G acceleration, deceleration in the space above the ground), efficiency of the cooling and heating equipment, the intensity of the lighting of the patient compartment, the hygienic cleanability of the surfaces of the patient compartment.

Patent application CN111942483 (A) (2020-11-17) describes a complex, multi-zone coupling structure, which operates a plurality of 3 interlocking cord/chain-actuated locking elements to fasten the superstructure to the chassis on rails and through a system of cylinders and handholds spread like a matrix. The pairs of T-shaped arresting rods of the coupling structure are operated by a mechanism equipped with a lever that moves up and down, which can turn back from a closed position, so the structure does not appear to be self-closing, it can easily come loose in the event of an accident. When listing the steps of the ambulance exchange, step A shows a state where one of 3 ambulance superstructures with different equipment is waiting to be placed on the chassis. The description suggests that the operator reserves fully equipped but unused superstructures in order to place one of them on a chassis when necessary. Considering today's rescue protocol, practice, and the cost of such fully equipped patient compartment superstructures, this approach is not viable. The description does not cover how the large, fully equipped patient compartment superstructure is waiting outside the chassis, and it is not obvious how the superstructure is placed in the arresting structure on the chassis. It is also clear from the drawings that the vertical extent of the actuator is considerable, it can hardly be installed in the depicted form in the very narrow space available between the top of the rear part of the chassis and the bottom of the superstructure on the basis of the limit values according to the ambulance standards.

A motorhome superstructure that can be detached from the chassis is known from Patent application U.S. Pat. No. 5,967,596A, in which a solution is described that cannot be compared with the ambulance superstructure in many respects. According to the description, the lifting, leveling and lowering of the motorhome superstructure is ensured by a lifting system integrated with the superstructure. Such or similar hydraulic or electromechanical lifts are bulky, they are heavy due to the high safety factors prescribed for lifting machines, unnecessarily increase air resistance and their extensions—perpendicular to the longitudinal axis of the vehicle—which make footing safer, reduce the useful volume of the living space (patient compartment) and/or increase the height of the floor plane. Since the mobile chassis must be able to drive forward between the legs of the jacks, the legs also increase the overall width of the moving vehicle. The coupling mechanism shown in FIG. 5 of the referenced description suggests that the driver of the mobile chassis must position the chassis extremely precisely under the motorhome superstructure between the supporting legs, so that the closing pin (19), characterized by a small tolerance, can safely pass through the openings created for it. At the same time, neither the picture nor the description shows how the motorhome superstructure is aligned and held in place. Even if the above characteristics seem acceptable for motorhomes, they would seriously impair the serviceability of emergency vehicles even separately. Although from area to area somewhat different relevant standards and trends prescribe the weight of the ready-to-run emergency vehicle within narrow limits, as well as the size of the internal service zones of the patient area. Ambulance services have specialist workshops, which also have lifting machines as needed, it is unnecessary for each vehicle to "carry" them to the service that requires fast movement. Unloading, loading or changing the superstructure of an ambulance on route is neither viable.

Patent application GB2164298A, describes a possible design form of an ambulance superstructure that can be demounted from a moving chassis. This description also lacks compliance with the strict regulations for emergency vehicles. The schematic drawings also show the voluminous coupling framework, which apparently raises the floor level of the patient area marked with a dashed line in FIG. 2 above the generally comfortable level of 750 mm (measured from the ground) which is prescribed in the standard in certain regions. While the description suggests that an ambulance superstructure can be replaced to another moving chassis, it's not clear how the attachment points (which aren't detailed at all) will adapt to the chassis geometries if it's a completely different type of vehicle. Another issue related to this is that the fold-down panels covering the chassis are attached to the superstructure, so they must be replaced during a possible change of chassis type (as well as due to different axle bases). The description also details in the explanations and claims that the superstructure replacement process involves several complex assembly operations (e.g., removal and installation of coverings, seals), which are steps that require time and human resources. The description calls the process compilation instead of connection, which can also be lengthy in time, according to the above.

Our aim is to create an ambulance that combines the advantages of a van and a box-type superstructure (larger interior size, low price, lower weight, quick manufacturability) while opening up new perspectives such as better ergonomics adapted to modern requirements, more favorable air resistance, and cost-effectiveness achieved by the use of much more modern materials, as well as higher level of hygiene, greater accident safety and, of course, the immediate, on-site (in the workshop) free replaceability of the superstructure. Another aim is that the ambulance superstructure according to the invention can serve 3-4 chassis (even different types) and remains usable for 8-10 years, during which time the operator would have to buy two or three pieces of a traditional van-style ambulance.

It has been realized that in the space with a vertical height of h=50-80 mm available between floor plane height (max. 750 mm) defined by the standard relating to ambulances and the construction plane of the self-propelled chassis capable of carrying the superstructure a slim coupling structure can be created, which is driven by an electric actuator between the top of the rear part of the chassis and the bottom of the superstructure, the coupling structure has two states, a fixed state and an unfixed state, in the fixed state of the coupling structure the superstructure is secured to the chassis in a ready to service movable manner by means of mechanical locking elements, while in the unfixed state of the coupling structure the superstructure can be freely lifted from the chassis in a vertical direction.

In the most general form of the ambulance according to the introductory paragraph of the invention, a coupling structure driven by an electric actuator is provided between the top of the rear part of the chassis and the bottom of the superstructure, the coupling structure has two states, a fixed state and an unfixed state, in its fixed state the coupling structure is arranged within the space with a given vertical height (h) between the top of the rear part of the chassis and the bottom of the superstructure, in the fixed state of the coupling structure the superstructure is secured to the chassis in a ready to service movable manner by means of mechanical locking elements, the electrically driven actuator of the coupling structure is coupled to the locking elements moving on a path in a straight line parallel to the longitudinal axis of the chassis, in the unfixed state of the coupling structure as compared to the fixed state of the coupling structure the superstructure is further back in relation to the direction of travel in the direction parallel to the longitudinal axis of the chassis, in the unfixed state of the coupling structure the superstructure can be lifted freely from the chassis in a vertical direction with an external device.

Box-type superstructures are produced by number of manufacturers, primarily for the German and British markets. Traditional box-type superstructures have robust design, heavy weight, difficult maneuverability, high air resistance, high price, and slow production.

The traditional box-type superstructures cannot be replaced on the chassis in a normal way, this can only be done by the specialists of the ambulance manufacturer, with a week's preparation, 4-8 hours of refitting work, in a specialist workshop, with a significant use of materials, destructively breaking connections and mainly at a significant cost, therefore the operators take this opportunity very rarely.

The ambulance according to the invention offers the opportunity to significantly reduce the number and value of spare vehicles, since the running chassis of a damaged or crashed ambulance can be replaced independently of the patient compartment by lifting the superstructure according to the invention and transferring it to a new/different chassis. Among the operating indicators of ambulance fleets, in addition to the total number of units, the availability time or percentage is another important factor. The use of the ambulance according to the invention makes the time-consuming repacking process unnecessary between ambulances, which currently entails the transfer of all instruments, disposable devices and medicines from the stopping ambulance to the replaced one. The use of the ambulance according to the invention reduces the repacking time to a few minutes, which previously required a minimum of two hours, and then the same amount of repacking time after the repair, so the fleet's availability time is increased. The superstructure, which includes the entire patient compartment, can be removed from the stopped chassis and placed on the new chassis in a maximum of 10 minutes, without having to move the instruments and devices from their place.

Currently, a serious problem in the production of ambulances is that the moving chassis must first arrive at the factory of the conversion company, so they can travel even tens of thousands of kilometres back and forth between continents, before reaching their destination as a ready-made ambulance. This, in addition to being expensive (usually only possible with a Ro-Ro ship), is also polluting. However, the superstructure of the ambulance according to the invention can be transported independently of the chassis, during transport, up to three superstructures can fit in one container, which can thus be delivered to the destination much cheaper than a complete ambulance. The ratio can be even four or five times as much. The chassis—after minimal preparation—await the arrival of the superstructure at the place of use. The installation of the ambulance superstructure according to the invention can be solved with the help of either a local partner or the operator's own service. This also creates economic interest for local partners, and the local added value is always a competitive advantage in private tenders and public procurements.

The loss of value of aging ambulances is significant, because in all European countries the use of ambulances has been maximized (in years or in the number of kilometres ran), so they can only be used for a limited time on the secondary markets. However, the superstructure of the ambulance according to the invention solves this problem as well, since aging but movable mobile chassis without the coupling structure can also be sold for other purposes (for example for traditional trucks), whose service life is no longer limited, so their loss of value is not so significant.

On the user side, the ambulance superstructure according to the invention contains ergonomic solutions that make patient care safer, more comfortable and more hygienic. The optimal placement of the patient and caregiver, the ergonomic placement of instruments—especially heavy devices (defibrillator, ventilator, etc.)—can reduce the physical load of ambulance workers and reduce the number of workplace injuries and accidents. The atmosphere at work improves, the patient care speeds up so it can be more satisfactory. Due to the use of materials and ergonomic aspects, the cleaning time is reduced, the cleanability of the patient compartment is improved, thereby the hygiene of the ambulance is increased.

The production of the ambulance superstructure according to the invention is fast, and thanks to the outlined plastic technology, a large quantity can be produced in a short time, so the manufacturing company has a chance to participate in international tenders targeting significant quantities, on which traditional box superstructure manufacturers can only calculate with a much longer delivery time.

The vertical height of the space available for the coupling structure between the top of the chassis of the ambulance according to the invention and the bottom of its superstructure can be maximized if the floor of the superstructure is as thin as possible. However, thinning the floor would limit the resistance to the extremely high mechanical loads required by the standards and to the forces arising during traffic. According to one possible version developed after optimization, the patient compartment of the ambulance superstructure is bordered by load-bearing internal walls consisting of fiber-reinforced vacuum-laminated composite parts glued together, the smooth internal surface (side A) of the internal walls colored in the material (mostly white) is the aesthetic surface of the patient compartment, while the superstructure is bordered from outside by external walls consisting of fiber-reinforced vacuum laminated composite parts glued together, the smooth outer surface (side A) of the outer walls colored in the material (mostly white, yellow or red) is the outer aesthetic surface of the superstructure, on the internal walls and on the external walls, openings suitable for human traffic and/or windows suitable for looking out are arranged in pairs, between the inner and outer walls spacers are provided, the spacers are rigidly attached to both the inner and outer walls, and in the free space between the inner and outer walls is filled with soundproof and/or heat insulating layers (except the floor area). The advantage of this structural design is that bodywork damage sustained in a traffic accident that does not affect the load-bearing inner wall can be quickly and cost-effectively remedied only by repairing or replacing the outer wall segment. In the above arrangement, according to the invention, the floor is the part of the load-bearing inner wall of the patient compartment of the ambulance superstructure, which is only a maximum of 10-15 mm thick, thereby a space with a maximum vertical height of 50-80 mm is available for the coupling structure.

In order for the ambulance superstructure according to the invention to be movably fixed to the chassis by the mechanical locking elements operated by the electrically driven actuator, in the fixed state of the coupling structure several different releasable form-locking connections must be implemented. Logically, the chassis holds the superstructure vertically downwards, but in all other directions, forward, backward, left, right, up, or in intermediate directions corresponding to free combinations of these, within certain limit values, the freedom of movement of the superstructure must be limited. The locking elements may be wedged connections, pin connections or other known releasable (form-)locking devices. Each of these must be strong enough to withstand unidirectional or multidirectional force effects of a given degree, which may occur during the transport of the ambulance, even in the event of an accident. Preferably, the locking elements are only able for coupling without gaps through (spring) preload compensating for the manufacturing deformations of the large coupling structure constructed from welded metal. It is also necessary to equip the coupling structure with a position lock that closes only when the coupling structure is in the fixed state, and which thereby signals the closed state via a transmitter. By having sufficient mechanical strength, the position lock can also participate in maintaining the roadworthy condition.

If the chassis moves or is replaced under the superstructure which is raised on the lever jack, the returning chassis will certainly not be able to stand back accurately where the replaced chassis was. It follows from this that when the superstructure is lowered back onto the chassis the coupling structure must be prepared to compensate (within a certain tolerance) for the imprecise arrangement. A possible solution for centering the superstructure of the ambulance according to the invention on the chassis is if a fixed front guide pin is provided on the side of the coupling structure facing the superstructure, the rear guide pin is moved by the locking elements operated by the electrically driven actuator, in the fixed state of the coupling structure, the front and the rear guide pins are closest to each other at the narrowest end of the front and rear grooves which narrow towards each other and formed at the bottom of the superstructure, then the longitudinal axis of the chassis and the longitudinal axis of the superstructure fit into a plane perpendicular to the top of the rear part of the chassis, when the coupling structure is unfixed, the guide pins are furthest from each other in the widest part of the front and rear grooves at the bottom of the superstructure. The guide pins, which always fit on an axis parallel to the longitudinal axis of the chassis, also prevent the superstructure from moving forward or backward, or to the left or right, when the coupling structure is in its fixed state.

In a possible design of the ambulance superstructure according to the invention, on an axis that fits on a plane perpendicular to the longitudinal axis of the chassis and the top of the rear part of the chassis, one to the left and one to the right of the longitudinal axis of the chassis, deflecting vertically upwards from the plane of the top of the rear part of the chassis by spring force, a pair of position-locking pins sharpened with a centering conical corner chamfer, which also functions as a position lock are provided, the pair of position-locking pins in the fixed state of the coupling structure simultaneously fills the holes created for them at the bottom of the superstructure, with this the fixed state is confirmed via electric transmitters, in all other states of the coupling structure the position-locking pin pair allows the superstructure to move freely on top of the rear part of the chassis through the locking elements operated by the electrically driven actuator, by pulling them back from the holes with mechanical force against the spring force. As long as the electrically operated actuator moving the locking elements as well pulls back both pins of the position-locking pin pair against the springs, the superstructure itself does not move.

The locking elements of the ambulance superstructure according to the invention individually and together gradually close between the fixed state and the unfixed state of the coupling structure, and produce a fixed state signalled by sensors through the closed position of the pairs of position-locking pins.

The movement between the fixed and unfixed states of the coupling structure is carried out by an electrically driven actuator through the locking elements. To reduce the load on the actuator, the surfaces moving on each other are preferably made of a weather-resistant material with a low coefficient of sliding friction (e.g. Teflon).

Since the coupling structure is arranged within the space between the top of the rear part of the chassis and the bottom of the superstructure, its entire structure must be permanently weatherproof.

Ambulances must be equipped with flow and medical systems, which primarily make patient care more comfortable and safer. Flow systems include, for example, internal combustion stove heating, air ventilation, air treatment (air conditioning) and the oxygen supply system essential for patient care. Operating experience shows that cooling-heating systems fail easily and often. If the operating elements of these systems are placed on the chassis, then by placing the ambulance superstructure according to the invention on another chassis that works reliably after maintenance, the patient care can be restarted after a few minutes of interruption. With convenient access to the removed chassis, the errors of all the systems on the chassis can be corrected in the specialist workshop, periodic maintenance work can also be carried out, and the operation of all the available systems can be tested. In one possible design of the ambulance according to the invention, the flow systems located on the chassis are equipped with one or more automatically closing and opening pipe ends, which together with the openings connected to the patient compartment for gas or liquid medium (e.g., cold or warm air) form a positioned, releasable form-locking connection along the direction of movement parallel to the longitudinal axis of the chassis, and in the fixed state of the coupling structure the one or more pipe ends provide a gas or liquid-tight passage with the corresponding one or more connecting openings. In this way, the operating systems of the flow systems (e.g., coolant, fuel pipes) do not have to be dismantled when separating the chassis and superstructure.

Since the superstructure that includes the patient compartment of the ambulance has several electrical systems (lighting, life protection systems, stretcher operating systems, etc.), these electrical systems must be disconnected at the latest after the coupling structure gets in unfixed state, but before removing the mobile chassis. In one possible version of the ambulance according to the invention, the superstructure and the chassis are connected by one or more pairs of electrical connectors that can be separated and plugged together automatically or manually.

Figure 3:
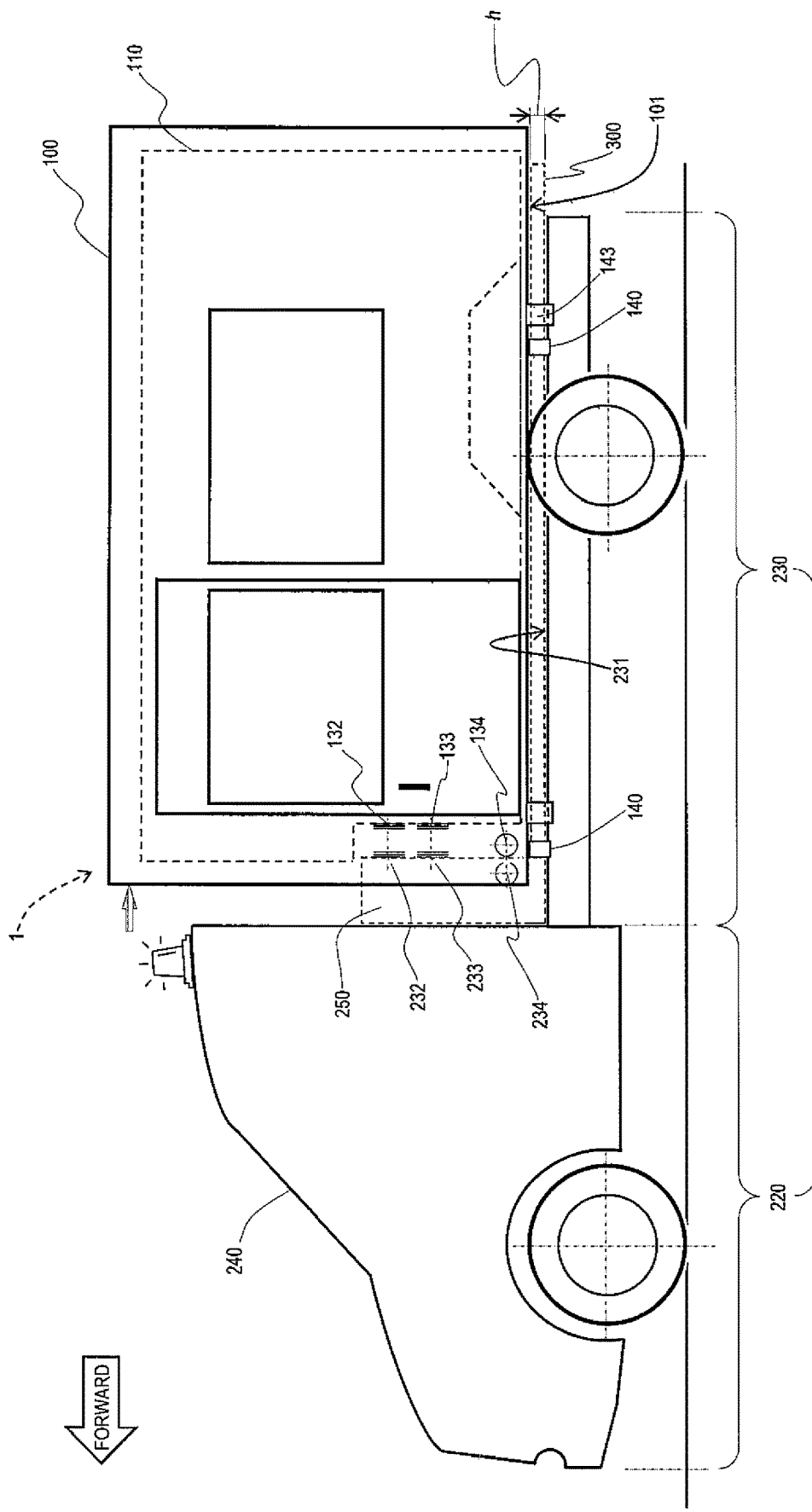
Figure 4:
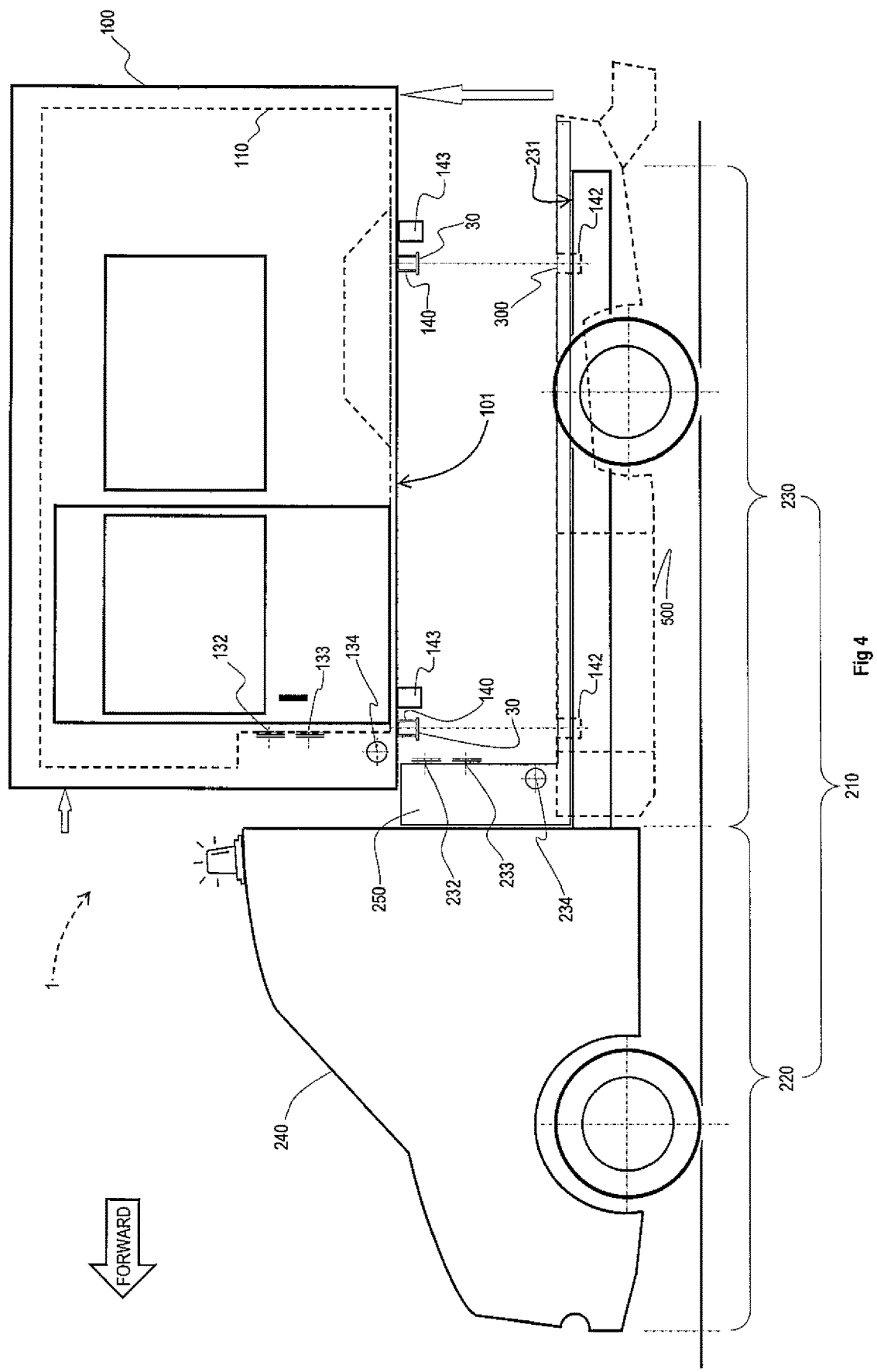
Figure 5:
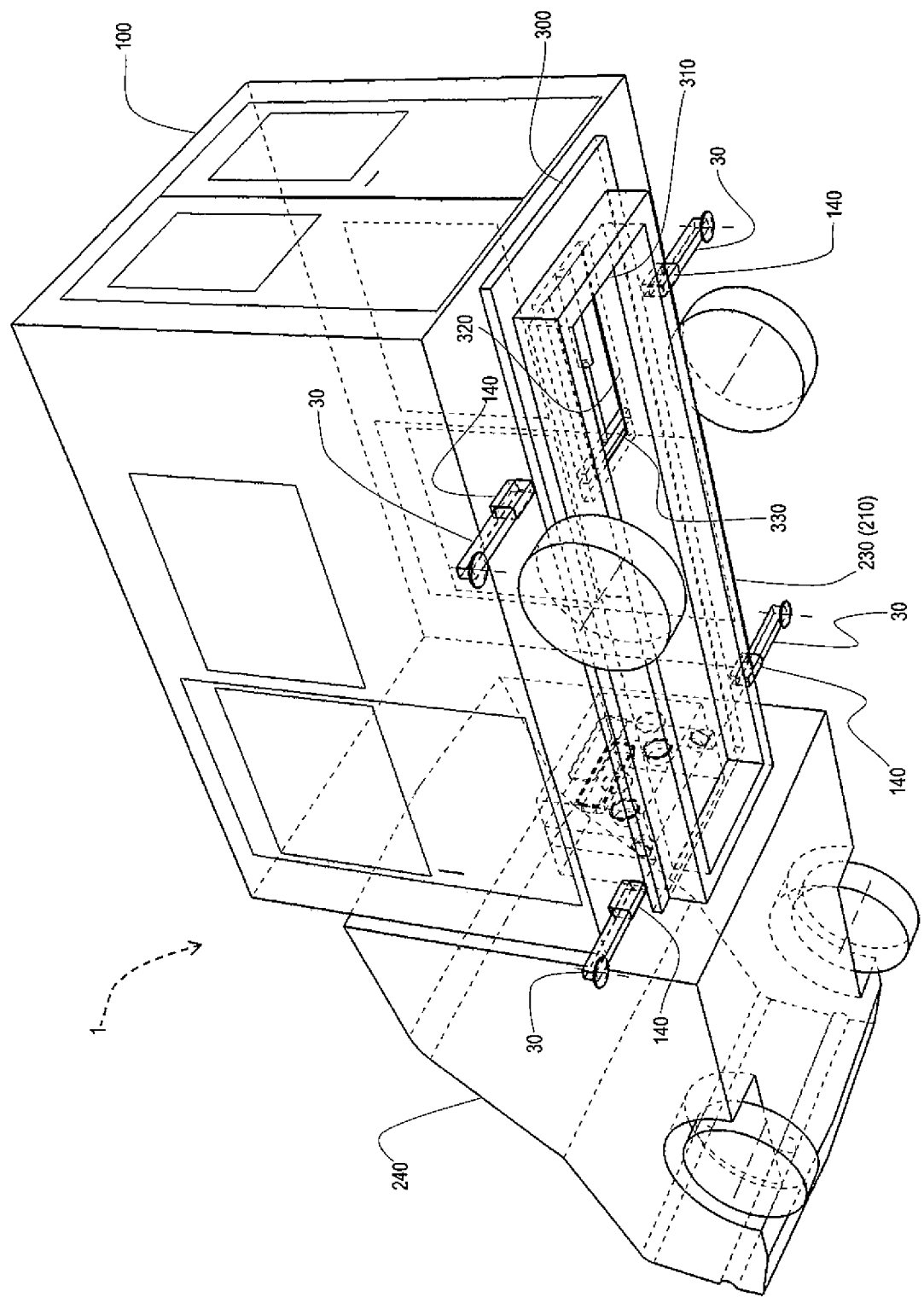

In the following, the invention will be described with reference to the accompanying drawings in which FIGS. 1-4 show the ambulance according to the invention in a side view, while FIG. 5 shows the ambulance according to the invention in a perspective view from below and behind.

In FIG. 1, a possible version of the ambulance 1 according to the invention can be seen in a side view, with a coupling structure 300 in a fixed state, having a vertical height h, delimited by a dashed line, and a cabin 240 resting on the front part 220 of the chassis 210, and the superstructure 100 including the patient compartment 110 and placed over the coupling structure 300 on top 231 of the rear part 230 of the chassis 210. In the Figure jacking points 140 are also shown formed on the left side at the front and the rear of the bottom 101 of the superstructure 100 (their right-side pairs are only visible in FIG. 5), and the left side front and rear covers 143 attached to the bottom 101 of the superstructure 100 according to the present design. FIG. 1 also shows that in the fixed state, the coupling structure 300 keeps the pipe ends 232, 233, 234 connected to the flow system 250 and the openings 132, 133, 134 connected to the patient compartment 110 of the superstructure 100 closed in a liquid-tight state.

Figure 2:
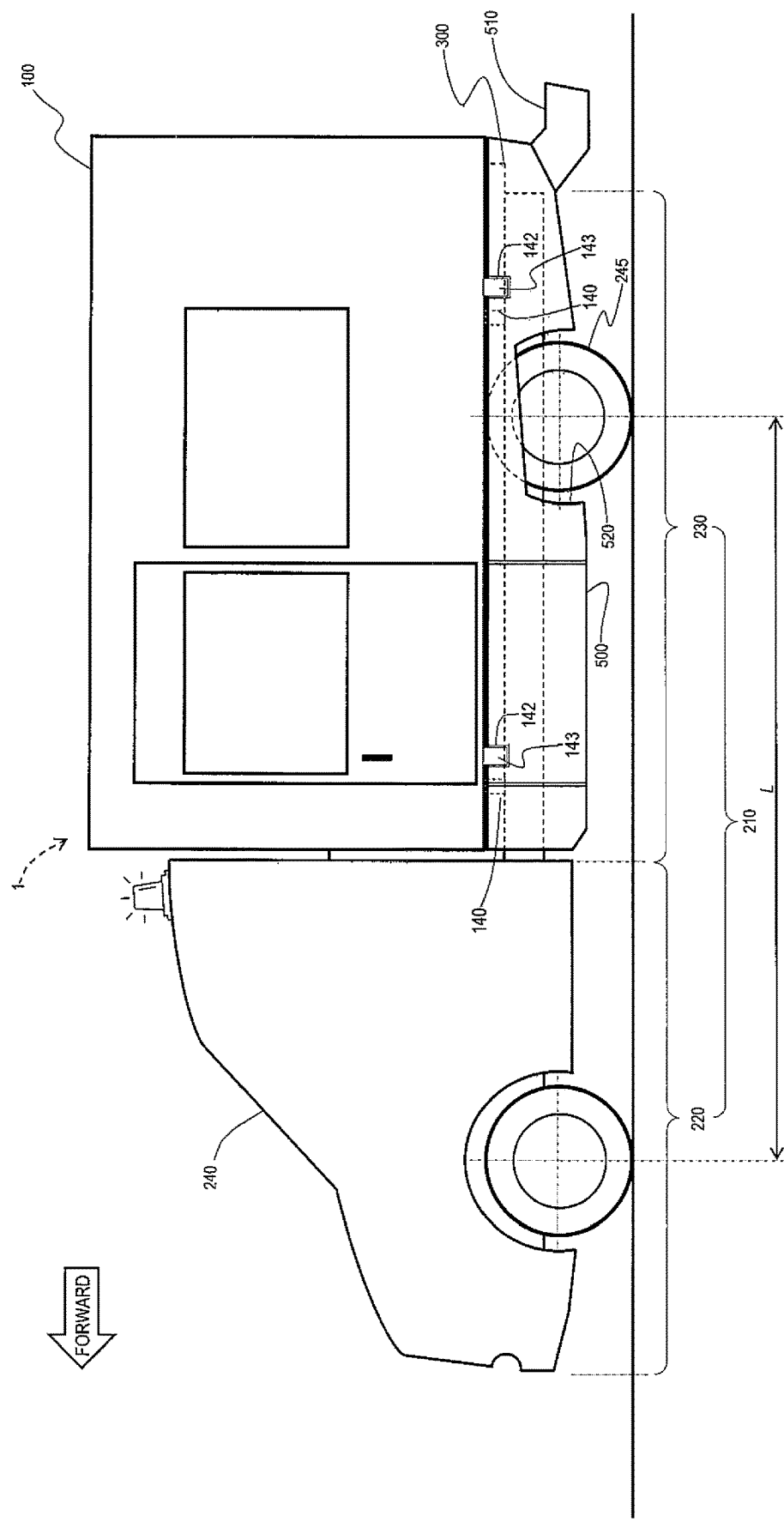

FIG. 2 also shows a possible version of the ambulance 1 according to the invention in a side view, with the coupling structure 300 being still in the fixed state and the cabin 240 resting on the front part 220 of the chassis 210, and the superstructure 100 placed over the coupling structure 300 on top 231 of the rear part 230 of the chassis 210. The jacking points 140 formed at the front and the rear part on the left side of the bottom 101 of the superstructure 100 are covered by the left front and left rear cover pieces 143 attached to the bottom 101 of the superstructure 100 according to the present design. In FIG. 2 a skirt 500 (not shown in FIG. 1) with the openings 142 formed on it is attached to the chassis 210 and/or the coupling structure 300. The openings 142 are closed by the appropriately shaped cover pieces 143 when the coupling structure 300 is in the fixed state, so that the surface of skirt 500 remains continuous. FIG. 2 also illustrates that the wheel well 520 formed on the skirt 500 is adapted to the wheelbase L of the actual chassis 210 so that there is sufficient space around the rear wheel 245. Finally, FIG. 2 illustrates one of the members of the skirt 500 which simultaneously covers the rear part of the ambulance 1 and provides access to the superstructure 100 as a step, and/or protects the vehicle as a bumper.

FIG. 3 is a side view of a possible version of the ambulance 1 according to the invention, but here the coupling structure 300 is in the unfixed state. The Figure shows the coupling structure 300 having a vertical height h, delimited by a dashed line, the cabin 240 resting on the front part 220 of the chassis 210. Further, on the top 231 of the rear part 230 of the chassis 210 the superstructure 100 is moved back by approximately 100 mm above the unfixed coupling structure 300, so the front left and rear left jacking points 140 on the bottom 101 of the superstructure 100 are no longer covered by the left front and left rear cover pieces 143 that are also attached to the bottom 101 of the superstructure 100. FIG. 3 also illustrates that in the unfixed state of the coupling structure 300, the pipe ends 232, 233, 234 connected to the flow systems 250 and the openings 132, 133, 134 connected to the patient compartment 110 of the superstructure 100 are spaced apart along the longitudinal axis of the chassis 210.

FIG. 4 also shows a side view of a possible design of the ambulance 1 according to the invention, with the cabin 240 resting on the front part 220 of the chassis 210, and with the coupling structure 300 in an unfixed state on top 231 of the rear part 230 of the chassis 210, with the difference that here the superstructure 100, which includes the patient compartment 110, is seen vertically raised, away from the coupling structure 300. For clarity, the skirt 500 is represented by a dashed line. In the unfixed state of the coupling structure 300, the cover pieces 143 parallel to the longitudinal axis of the chassis 210 open up, in this manner the openings 142 on the skirt 500 provide free access to the jacking points 140, so that the bridging elements 30 can be fitted into place before lifting. The solution according to the invention is based on the use of a lever jack, so the jacking points of the lever jack are able to hold the weight of the superstructure 100, lift the superstructure 100, or let it back onto the coupling structure 300 by placing them under the outer end of the bridging elements 30 in the nests formed at the jacking points 140 at the bottom of the superstructure 100. The bridging elements 30 are much better illustrated in FIG. 5. FIG. 4 also shows that the openings 132, 133, 134 connected to the patient compartment 110 of the raised superstructure 100, and the pipe ends 232, 233, 234 connected to the flow systems 250 are not only distant from each other along the longitudinal axis of the chassis 210, but they are also distant from each other vertically.

The chassis 210 of the ambulance according to the invention is covered by the skirt 500, around under the superstructure 100, as an extension of its outer walls. In order to be able to lift the superstructure 100 from the chassis 210 with a lever jack, it would be necessary to somehow turn the robust arms of the lever jack under the superstructure 100, but in our case the skirt 500 does not allow this. It can also be a problem that the driver of the ambulance according to the invention cannot always stand exactly in the same place between the lifting arms of the lever jack. If the driver stands somewhere else, the lifting arms of the lever jack must be positioned differently to reach the lifting points 140 at the bottom of the superstructure 100. To ensure that the lifting is always carried out without problems and quickly, either large, openable and closable openings 142 would have to be created on the skirt 500, or the entire skirt 500 would have to be made detachable or openable, which would result in an ambulance with a heavier and more complex structure, which would adversely affect the everyday service. In a possible solution aimed at achieving simple and quick lifting on the ambulance according to the invention, in the unfixed state of the coupling structure 300 the four jacking points 140 formed on the longitudinal outer sides of the superstructure 100 are connected in pairs to the ends of the arms of the lever jack located outside the ambulance by means of the bridging elements 30. The bridging elements 30 can be welded metal rods, which can be inserted manually into the nests of the jacking points 140 at the bottom of the superstructure 100 by the service personnel. For safety reasons, access to the lifting points 140 on the superstructure of the ambulance according to the invention is only possible when the coupling structure 300 is in its unfixed state, since in the fixed state of the coupling structure 300 the openings formed on skirt 500 are covered on each side by the at least one cover piece 143. Also, for safety reasons, the bridging elements 30 must be removed from each of the jacking points 140 formed on the superstructure 100 of the ambulance according to the invention, otherwise the electrically driven actuator 310 cannot be operated. With the bridging elements 30 not removed, the coupling structure 300 cannot switch from its unfixed state to its fixed state. Naturally, the bridging elements 30 are stored and used by the base operating the lever jack when lifting and replacing the superstructure 100 of the ambulance according to the invention.

FIG. 5 is a perspective view of a possible design of the ambulance 1 according to the invention from below-rear, showing the cabin 240 resting on the front part 220 of the chassis 210, the rear part 230 of the chassis 210 with coupling structure 300 in the unfixed state, and the four jacking points 140 formed at the bottom 101 of the superstructure 100 with the bridging elements 30 in their nests. The bridging elements 30 are needed because the skirt 500 (not marked in the Figure) does not allow the robust arms of the lever jack access to the jacking points 140 formed at the bottom 101 of the superstructure 100. In this Figure, the electrically driven actuator 310, the linear path 320 parallel to the longitudinal axis of the chassis 210, and the locking elements 330 can be seen from below. The complex actuator 310, which prevents movement of the superstructure 100 and moves the locking elements 330 for creating and unlocking multi-directional mechanical, form-locking connections, can be screw spindles, pistons, etc. designed, advantageously, in the event of a malfunction, it can have a drive-in for manual operation.

The advantage of the ambulance according to the present invention lies, among other things, in the economical utilization of the lifespan of expensive vehicles.

The invention claimed is:

1. Ambulance having a chassis (210) that can move by itself and a self-supporting superstructure (100) including the patient compartment (110), the superstructure (100) fits on the rear part (230) of the chassis (210) from above and is releasably fixed to it with mechanical connection; and has a driving cab (240) built together with the front part (220) of the chassis (210); a coupling structure (300) driven by an electric actuator (310) is provided between the top (231) of the rear part (230) of the chassis (210) and the bottom (101) of the superstructure (100), the coupling structure (300) has two states, a fixed state and an unfixed state, in its fixed state the coupling structure (300) is arranged within the space with a given vertical height (h) between the top (231) of the rear part (230) of the chassis (210) and the bottom (101) of the superstructure (100), in the fixed state of the coupling structure (300) the superstructure (100) is secured to the chassis (210) for moving with it by means of mechanical locking elements, the electrically driven actuator (310) of the coupling structure (300) is coupled to the locking elements (330) moving on a path (320) in a straight line parallel to the longitudinal axis of the chassis (210), in the unfixed state of the coupling structure (300) as compared to the fixed state of the coupling structure (300) the superstructure (100) is further back in relation to the direction of travel in the direction parallel to the longitudinal axis of the chassis (210), in the unfixed state of the coupling structure (300) the superstructure (100) can be lifted freely from the chassis (210) in a vertical direction with an external device; characterized in that the rear part (230) of the chassis (210) are equipped with one or more automatically closing and opening pipe ends (232, 233, 234) connected to the flow system (250) conveying gas or liquid medium and placed on the chassis (210), the superstructure (100) is provided with one or more external connecting openings (132, 133, 134) which together with the respective one or more pipe ends (232, 233, 234) form a positioned, releasable form-locking connection along the direction of movement parallel to the longitudinal axis of the chassis (210), and in the fixed position of the coupling structure (300) the one or more pipe ends (232, 233, 234) together with the corresponding one or more connecting openings (132, 133, 134) provide a gas or liquid-tight passage.

2. The Ambulance according to claim 1 characterized in that on the chassis (210) the one or more pipe ends (232, 233, 234) are connected to one or more subsystems selected from the following group: ventilation system; air-conditioning system; internal combustion or electric heater; water supply system, medical gas supply system.

3. The Ambulance according to claim 1 characterized in that the superstructure (100) and the chassis (210) are coupled together by means of one or more pairs of electrical connectors that can be separated and plugged together automatically or manually.

4. The Ambulance according to claim 1 characterized in that the given vertical height (h) is more than 50 mm but less than 80 mm.

5. The Ambulance according to claim 4 characterized in that a skirt (500) encircles the rear part (230) of the chassis (210) on the side and at the back, the skirt (500) is secured rigidly to the coupling structure (300) and/or to the chassis (210), the rear member of the skirt (500) is the rear step and/or rear bumper (510), and the skirt (500) has a wheel well (520) around the rear wheels (245) of the chassis (210) arranged according to the axle base (L) of the chassis (210).

6. The Ambulance according to claim 5 characterized in that the superstructure (100) and/or the skirt (500) are provided with four openings (142) on their external longitudinal sides for access to the jacking points (140) formed on the superstructure (100) to allow lifting by a known lever jack.

7. The Ambulance according to claim 6 characterized in that the four openings (142) are provided with a movable cover piece (143).

8. The Ambulance according to claim 7 characterized in that at least one of the cover pieces (143) covering openings (142) is open only in the unfixed state of the coupling structure (300).

\* \* \* \* \*